US008719395B2

(12) United States Patent
Chevanne et al.

(10) Patent No.: US 8,719,395 B2
(45) Date of Patent: May 6, 2014

(54) METHOD AND DEVICE FOR PROCESSING DATA FOR GENERATING ALARMS WITHIN A COMMUNICATION NETWORK

(75) Inventors: Michel Chevanne, Clamart (FR); Bertrand Lapraye, Gif sur Yvette (FR); Philippe Drugmand, Fontenay aux Roses (FR)

(73) Assignee: Alcatel Lucent, Paris (FR)

( * ) Notice: Subject to any disclaimer, the term of this patent is extended or adjusted under 35 U.S.C. 154(b) by 2259 days.

(21) Appl. No.: 10/625,721

(22) Filed: Jul. 24, 2003

(65) Prior Publication Data
US 2005/0091404 A1 Apr. 28, 2005

(30) Foreign Application Priority Data
Jul. 25, 2002 (FR) .................................... 02 09437

(51) Int. Cl.
*G06F 15/16* (2006.01)
(52) U.S. Cl.
USPC ......................................... 709/224; 709/446
(58) Field of Classification Search
USPC .......................................................... 709/224
See application file for complete search history.

(56) References Cited

U.S. PATENT DOCUMENTS

| 5,202,977 | A | | 4/1993 | Pasetes, Jr. et al. |
|---|---|---|---|---|
| 5,751,914 | A | * | 5/1998 | Coley et al. ...................... 706/47 |
| 5,907,696 | A | * | 5/1999 | Stilwell et al. .................. 703/13 |
| 5,987,513 | A | | 11/1999 | Prithviraj et al. |
| 6,253,243 | B1 | * | 6/2001 | Spencer ........................ 709/224 |
| 6,292,829 | B1 | * | 9/2001 | Huang et al. ................... 709/223 |
| 6,333,931 | B1 | * | 12/2001 | LaPier et al. ................... 370/385 |
| 6,363,421 | B2 | * | 3/2002 | Barker et al. .................. 709/223 |
| 6,487,521 | B1 | * | 11/2002 | Carney .......................... 702/186 |
| 6,985,901 | B1 | * | 1/2006 | Sachse et al. ................... 707/10 |
| 2002/0184528 | A1 | * | 12/2002 | Shevenell et al. ............. 713/201 |
| 2003/0069848 | A1 | * | 4/2003 | Larson et al. ................... 705/50 |
| 2003/0217110 | A1 | * | 11/2003 | Weiss ............................. 709/207 |
| 2004/0122645 | A1 | * | 6/2004 | Shevenell et al. ............... 703/21 |

OTHER PUBLICATIONS

G. Jakobson et al, "GRACE: Building Next Generation Event Correlation Services", XP010376718, 2000 IEEE.

* cited by examiner

*Primary Examiner* — Tauqir Hussain
(74) *Attorney, Agent, or Firm* — Wolff & Samson, PC

(57) ABSTRACT

A data processing device comprises processing module capable of receiving from equipment in a communications network primary data defining events in at least one primary format, and delivering to a management device in the network secondary data defining alarms representing events, in a secondary format. The processing module comprise an interpreter provided with conversion rules, arranged in the form of scripts associated with the various primary event formats, and arranged to convert, using these rules, primary data received in one of the primary formats into secondary data in the secondary format which can be interpreted by the management device.

30 Claims, 1 Drawing Sheet

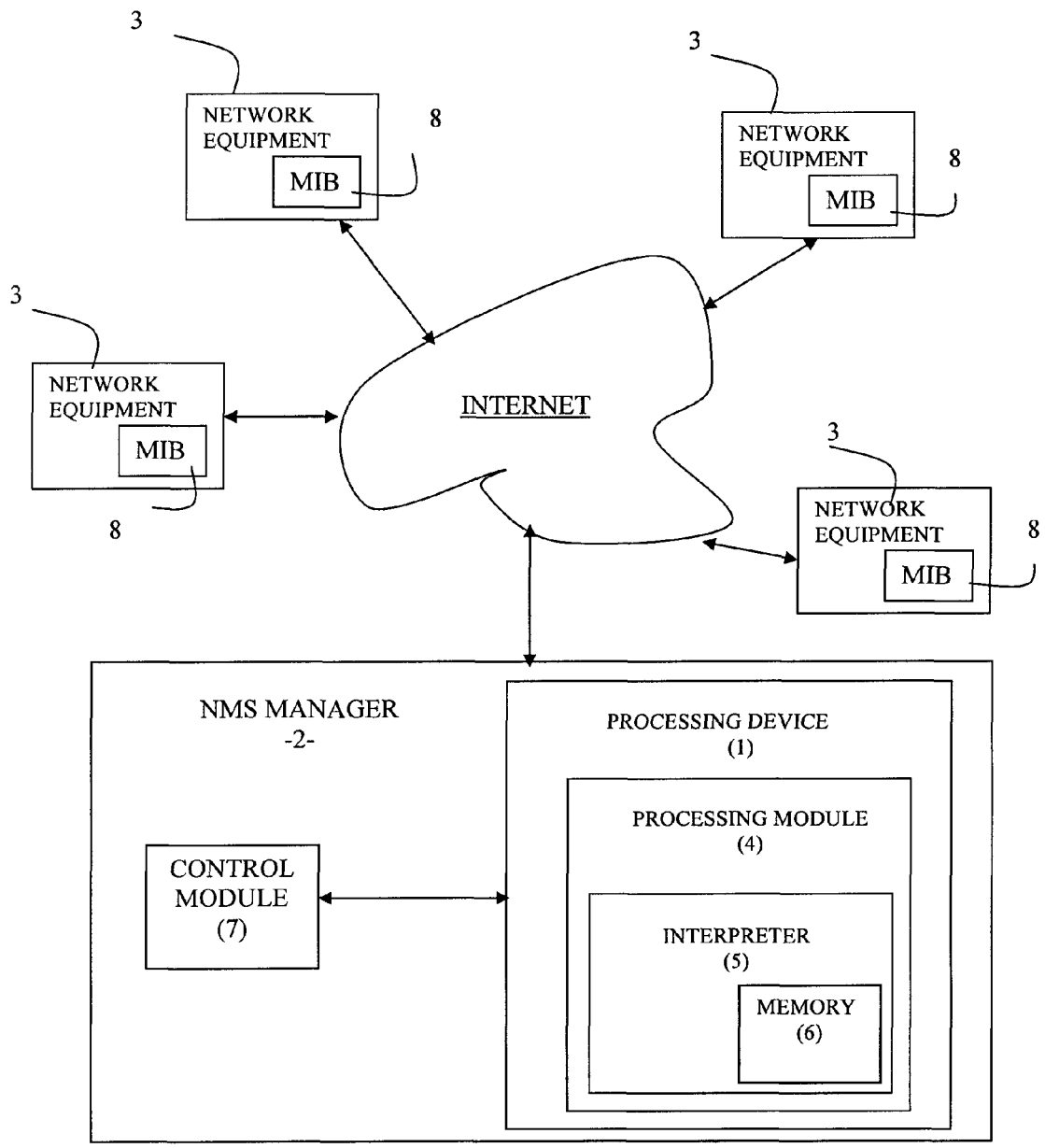

METHOD AND DEVICE FOR PROCESSING DATA FOR GENERATING ALARMS WITHIN A COMMUNICATION NETWORK

FIELD OF THE INVENTION

The invention concerns the field of the exchange of data between equipment in a communications network and more particularly the field of the management of events occurring within the said equipment.

Communications networks generally comprise a network management device (or NMS, standing for "Network Management System") which is supposed to warn the operator when an event occurs in an equipment. More precisely, each time an event occurs within an item of equipment, or in an apparatus supervised by this equipment, the latter delivers a notification representing the said event. This notification, more usually known by the English expression "Trap" when the network management protocol is the SNMP protocol (standing for "Simple Network Management Protocol" RFC 2571-2580), consists of primary data arranged in primary formats (or protocols). On reception of these primary data the NMS manager analyzes the content thereof and then, if it recognizes the first format, it generates an alarm defined by secondary data arranged in a unique predefined secondary format (or protocol).

However, because of their great variety, the items of equipment in a network frequently use different primary exchange formats which are difficult, or even impossible, to modify. Consequently NMS managers can recognize only some of the notifications which they receive.

To attempt to remedy this drawback, it has been proposed to equip the NMS manager with a primary data processing module based either on a format correlation tool or on program codes, or again on configuration files. The first solution, based on a correlation tool, uses processings whose slowness is prohibitive. The second solution, based on program codes, requires very expensive development. Finally, the third solution is not sufficiently flexible to be suitable for situations in which the primary formats are fairly different, which is generally the case. In addition, these solutions do not generally make it possible to synchronize or resynchronize the alarm state of the equipment at the NMS manager. Consequently no solution proposed is actually satisfactory.

SUMMARY OF THE INVENTION

The purpose of the invention is therefore to remedy all or some of the aforementioned drawbacks.

It proposes for this purpose a data processing device comprising processing means capable of receiving, from equipment in a communications network, primary (or notification) data defining events in at least one primary format and of delivering to a management device in the network (or NMS manager) secondary data defining alarms representing events, in a secondary format.

This device is characterized by the fact that its processing means comprise an interpreter (or "scripting engine") provided with conversion rules, arranged in the form of "scripts" associated with the various primary event formats, and arranged so as to convert, by means of these rules, primary data received in one of the primary formats into secondary data in the secondary format which can be interpreted by the management device.

Preferentially, the interpreter is arranged to make its conversions in a secondary configuration file format by means of an interpreted language. More preferentially still, the secondary configuration file format is a format of the XML (standing for "extensible Markup Language" type—version 1.0 recommended by W3C), and/or the interpreted language is JavaScript (as defined by ECMA-262 ECMAScript: A general purpose, cross-platform programming language).

Also preferably, when the primary data are respectively associated with event identifiers, such as for example object identifiers (or OIDs), the interpreter can be arranged so as to store at least some of the configuration rules in correspondence with known event identifiers. In this case, the interpreter can also be arranged so as to store at least one conversion rule defining a default script intended for the primary data which are associated with an unknown event identifier.

Advantageously, the interpreter can be arranged so as to deduce, from certain received primary (or notification) data, alarm parameters enabling it to deliver a parameterized alarm to the management device. In this case, the alarms can be parameterized by "hard-coded" values and/or values extracted from primary data, and/or values extracted from an item of equipment. In the latter case, the interpreter must be arranged to extract, from an item of equipment in the network whose alarm state is unknown (preferably from its management information base or MIB), chosen information representing its alarm state, and then simulate the sending of primary (or notification) data representing this state information, so as to generate an alarm intended to indicate to the management device the alarm state of the equipment.

Moreover, the primary data are preferentially received in primary formats of the SNMP type (Internet management protocol).

The invention also relates to a network management device (or NMS manager) comprising a processing device of the type presented above.

The invention also relates to a data processing method in which, on reception of primary (or notification) data transmitted by equipment in a communications network and defining events in at least one primary format, there are delivered to a network management device (or NMS manager) secondary data defining alarms representing events, in a secondary format.

This method is characterized by the fact that its generation step consists of converting, by means of conversion rules, arranged in the form of "scripts" associated with the various primary event formats, primary data received in one of the primary formats into secondary data in the secondary format which can be interpreted by the management device.

The method according to the invention can comprise any supplementary characteristics which can be taken separately and/or in combination, and in particular:

- conversion can be carried out in a secondary configuration file format by means of an interpreted language. It is then preferable for the secondary format of the configuration file to be a format of the XML type, and/or for the interpreted language to be JavaScript;
- when there are primary data associated respectively with event identifiers, at least some of the conversion rules can be associated with known event identifiers. In this case, it is advantageous for at least one of the conversion rules to be defined by a default script intended for primary data associated with an unknown event identifier;
- certain primary data received can be deduced from the alarm parameters, so as to deliver to the management device an alarm which is parameterized, for example by "hard-coded" values and/or values extracted from the primary data and/or values extracted from an item of equipment;

it is possible to extract from an item of equipment in the network, whose alarm state is unknown, chosen information representing its alarm state, and then simulate the sending of primary data representing this state information, so as to generate an alarm intended to indicate to the management device the alarm state of the equipment. This extraction preferentially takes place in the management information base of the equipment concerned;

the primary data are preferentially received in primary formats of the SNMP type.

The invention can in particular be implemented in all network technologies which have to be managed, and in particular in transmission networks (for example of the WDM, SONET or SDH type), data networks (for example of the Internet-IP or ATM type) or voice networks (for example of the conventional, mobile or NGN type).

Other characteristics and advantages of the invention will emerge from an examination of the following detailed description, and from the single accompanying FIGURE which schematically illustrates an example embodiment of a device according to the invention located in an NMS manager of a communications network. This FIGURE is essentially certain in character. Consequently it can not only serve to supplement the invention but also to contribute to its definition, where necessary.

DETAILED DESCRIPTION OF THE INVENTION

The processing device 1 according to the invention is intended to supply alarms to an NMS (standing for "Network Management System") manager 2 in a communications network, for example of the Internet type. In the example illustrated in FIG. 1, this device 1 is located in the NMS manager 2 but could be located in an external box coupled to the said NMS manager.

The communications network comprises a multiplicity of network equipment 3, such as for example servers, terminals, switches or routers, able to exchange data with the NMS manager 2 in accordance with a network management protocol.

Hereinafter, it is considered by way of non-limiting example that the communications network is of the Internet (IP) type and that the network management protocol is the SNMP protocol (standing for "Simple Network Management Protocol" RFC 2571-2580). Naturally the invention applies to other types of network, such as for example transmission networks of the WDM, SONET or SDH type, data networks of the ATM type, or voice networks of the conventional, mobile or NGN type, and to other network management protocols, such as for example TL1 or CORBA. The equipment 3 in the network is arranged to deliver to the NMS manager 2 notifications (or messages), here of the "Trap" type, defined by primary data arranged in a primary format (or protocol), here of the SNMP type, whenever an event occurs within them, or in an item of equipment or apparatus which they control. The primary data in a notification consequently define an event which has occurred in an item of equipment 3. A multiplicity of different primary formats can coexist within the network. Moreover, each notification is preferentially associated with an identifier representing a type of event.

The processing device 1 comprises a processing module 4 comprising an interpreter (or "scripting engine") 5 having available a multiplicity of conversion rules arranged in the form of "scripts" associated with a multiplicity of different primary event formats.

More precisely, to each primary format there corresponds a particular script (or conversion rule or rules), preferentially stored in a memory 6 in correspondence with one of the event identifiers contained in the notifications (or Traps). It is also preferable to provide at least one default script for processing (or initiating the processing of) the primary data arranged in a primary format which is associated with an unknown event identifier.

Thus, when an interpreter 5 receives a notification (or Trap), it extracts the event identifier therefrom and determines the configuration rule (or script) stored which corresponds to it. It can then apply this script (or rule) to the primary data defining the notification, so as to generate an alarm defined by secondary data arranged in an interpreted language and in accordance with a unique secondary format which can be interpreted by a control module 7 of the NMS manager 2. In other words, the primary data received, arranged in a primary format and representing an event, are "converted" into secondary data arranged in a secondary format and in an interpreted language.

On reception of such an alarm, the control module 7 of the NMS manager 2 can then cause the display of the alarm on a control screen of the said NMS manager and/or decide on action or actions to be undertaken in the network in order to take account of the alarm and/or remedy its cause.

The interpreter 5 is arranged, on reception of the primary data, to generate, by means of the script which corresponds to the primary data received, an alarm defined by secondary data. In a preferential embodiment, these secondary data are arranged in the form of an alarm configuration file in a secondary format (or protocol), preferably of the XML (standing for "extensible Markup Language") type, and in an interpreted language (or "scripting language"), preferably of the JavaScript type (as defined by ECMA-262 ECMAScript: A general purpose, cross-platform programming language). More preferentially still, version 1.0 of the XML format recommended by W3C is chosen.

Naturally, other interpreted languages (or "scripting languages") and other secondary formats could be envisaged. Thus XML can be replaced by proprietary text formats. Likewise, the JavaScript language of the scripts can be replaced, for example, by VisualBasic, TCL, Perl or Python.

In this example, the event identifier, enabling the interpreter 5 to determine the script corresponding to the primary format of the primary data received, is preferentially of the OID type ("Object Identifier"—a simple type of ASN.1 identifier for identifying an object such as an event), since the interpreter language, used by the interpreter 5 for generating the configuration files (secondary data), is JavaScript.

The syntax used for generating the alarm configuration files (or secondary data) is therefore here a combination of XML and JavaScript. More precisely, firstly, the general structure of the file is of the XML type, and secondly the secondary data defining the alarm associated with an OID notification received are always framed by two XML blocks (or "tags"), thirdly each alarm field has a single input, and fourthly each input of the alarm is either a constant or a JavaScript expression.

Thus, when all the alarm inputs are constants, the alarm configuration file is principally of the XML type. For example, it is in the form <SEVERITY>Critical</SEVERITY>. When at least some of the alarm inputs are JavaScript expressions, a maximum amount of flexibility can be obtained. The file is then, for example, in the form <SEVERITY> (trapget("1.2.3.4")==2)? Critical: Major</SEVERITY>.

Some alarm fields generated may be optional or have a default value.

By virtue of the scripts, it is possible to take full advantage of the information contained in the primary data which constitute the notifications received. Many processings, in particular logic and/or calculational, can thus be applied to the parameters which define the events indicated by the equipment 3 in the network. Consequently the interpreter 5 can not only generate an alarm representing an event but also accompany this alarm with parameters (or parameter values) able to facilitate the processing thereof at the NMS manager 2.

The alarms can thus be parameterized by "hard-coded" values and/or extracted from the notification (or Trap) and/or extracted from equipment from which a notification (or Trap) has been received.

In order to implement this third possibility, the interpreter 5 must be arranged so as to send to an item of equipment from which it has possibly received primary data representing an unknown alarm state a message requesting from it certain information able to allow the determination of the said alarm state. This information is generally contained in the management information base 8 (or MIB) of the equipment 3.

By virtue of this arrangement enabling it to extract information from a distant item of equipment 3, and in particular from its MIB 8, the device according to the invention 1 can fulfil a function of synchronization and resynchronization of the alarm state of each item of equipment. This is because, whenever the NMS manager of the network 2 (or its processing device 1) is restarted or disconnected from the rest of the network, for example in the event of breakdown or maintenance work, it must firstly be resynchronized with respect to the respective alarm states of the equipment 3 in the network which were present when it was disconnected, which states may have changed, and secondly synchronized with respect to the respective alarm states of the new items of equipment 3 in the network, which states are unknown to it. The same applies whenever a new item of equipment 3 is connected to the network or an old item of equipment is reconnected to the network.

This function can be provided by one or more rules, for example stored in the memory 6, or automatically at each switching on and/or whenever the interpreter 5 is advised of a (re)connection by the control module 7 of the NMS manager 2 of the network, or semi-automatically whenever the person responsible for managing the network gives the instruction for this to the interpreter 5.

The (re)synchronization rule or rules are arranged so as to examine the content of the MIB of the designated item or items of equipment 3, so as to extract the information (parameter or parameters or parameter value or values) defining their alarm state or states. However, these rules can also serve to verify or check the value of one or more parameters. As indicated above, in some situations all the equipment in the network which dialogue with the NMS manager 2 can be the subject of an examination by means of (re)synchronization rules.

The (re)synchronization rule or rules can be arranged so as to simulate the sending of a notification (or Trap) within the NMS manager 2. More precisely, they indicate any notifications (or Traps) which the equipment 3 might have sent in order to change from an alarm-free state to its current state. These simulated notifications (or Traps) are then the subject of a conversion similar to that applied to the actual notifications.

The processing module 4 of the device 1 and its interpreter 5 can be respectively produced in the form of electronic circuits, software (or data processing) modules or a combination of circuits and software.

The invention also offers a data processing method in which, on reception of primary data transmitted by equipment 3 in a communications network and defining events in at least one primary format, there are delivered to a management device in the network 2 (or NMS manager) secondary data which define alarms representing these events, in a secondary format.

This can be implemented by means of the processing device presented above. The principal function and the optional subfunctions provided by the steps of this method being substantially identical to those provided by the various means constituting the processing device 1, only the step implementing the principal function of the method according to the invention will be summarized below.

This method is characterized by the fact that its generation step consists of converting, by means of conversion rules, arranged in the form of "scripts" associated with the various primary event formats, primary data, received in one of the primary formats, into secondary data in the secondary format which can be interpreted by the management device 2.

By virtue of the invention, it is no longer necessary to have recourse to programming, which reduces the development costs. In addition, the scripts procure a great flexibility in use and a high processing speed (several tens of notifications (or Traps) per second) and allow rapid adaptation to all types of primary format. In addition, the invention allows (re)synchronization.

The invention is not limited to the embodiments of the method and devices described above, solely by way of example, but encompasses all variants which might be envisaged by a person skilled in the art within the scope of the following claims.

What is claimed is:

1. A data processing device comprising:
a display configured to display alarms;
a processor configured to receive, from an item of equipment in a communications network, primary data defining events in at least one primary data format and delivering to a management device in said network secondary data defining the alarms representing said events, in a secondary data format,
wherein said processor comprises an interpreter which is provided with a plurality of conversion rules, arranged in the form of scripts that are interpreted by the interpreter and are associated with a plurality of different primary data formats, and arranged so as to convert, by means of said rules, the primary data received in one of said primary data formats into secondary data in said secondary data format which can be processed by said management device, said interpreter further arranged to deduce alarm parameters from certain primary data received, so as to deliver a parameterized alarm to said management device,
wherein, when the alarm state of the item of equipment in the network is unknown, said interpreter is arranged to extract from said item of equipment chosen information able to allow determination of said alarm state, and then to simulate the sending of primary data representing said state information, so as to generate an alarm intended to indicate to the management device the alarm of said item of equipment, and
wherein each of the plurality of different primary data formats corresponds to a particular script.

2. The device as claimed in claim 1, wherein said interpreter is arranged to make said conversions into a secondary configuration file format by means of an interpreted language.

3. The device as claimed in claim 2, wherein said secondary configuration file format is XML.

4. The device as claimed in claim 2, wherein said interpreted language is selected from a group consisting of JavaScript, Visual Basic, TCL, Perl and Python.

5. The device as claimed in claim 1, wherein, when there are primary data associated respectively with event identifiers, said interpreter is arranged to store at least some of said rules in correspondence with known event identifiers.

6. The device as claimed in claim 5, wherein said interpreter is arranged to store at least one conversion rule defining a default script intended for the primary data associated with an unknown event identifier.

7. The device as claimed in claim 1, wherein said interpreter is arranged to deliver to said management device alarms parameterized by hard coded values.

8. The device as claimed in claim 1, wherein said interpreter is arranged to deliver to said management device alarms parameterized by values extracted from said primary data.

9. The device as claimed in claim 1, wherein said interpreter is arranged to deliver to said management device alarms parameterized by values extracted from the equipment from which it has received the primary data.

10. The device as claimed in claim 1, wherein said interpreter is arranged to extract said chosen information from a management information base of the equipment concerned.

11. The device as claimed in claim 1, wherein said primary data are received in primary formats of the SNMP type.

12. A network management device, comprising a processor which receives, from an item of equipment in a communications network, primary data defining events in at least one primary data format and delivering to a management device in said network secondary data defining alarms representing said events, in a secondary data format,
wherein said processor comprises an interpreter provided with a plurality of conversion rules, arranged in the form of scripts associated with a plurality of different primary data formats, and arranged so as to convert, by means of said rules, primary data received in one of said primary data formats into secondary data in said secondary data format which can be interpreted by said processor, said interpreter further arranged to deduce alarm parameters from certain primary data received, so as to deliver a parameterized alarm to said management device,
wherein, when the alarm state of the item of equipment in the network is unknown, said interpreter is arranged to extract from said item of equipment chosen information able to allow determination of said alarm state, and then to simulate the sending of primary data representing said state information, so as to generate an alarm intended to indicate to the management device the alarm of the item of equipment, and
wherein each of the plurality of different primary event formats corresponds to a particular script.

13. A data processing method in which, on reception of primary data transmitted by an equipment in a communications network and defining events in at least one primary format, there are delivered to a management device of the network secondary data defining alarms representing said events, in a secondary format,
wherein said method further comprising the step of converting, by means of one of a plurality of conversion rules, arranged in the form of scripts associated with a plurality of different primary event formats, primary data received in one of said primary formats into secondary data in said secondary format which can be interpreted by said management device,
wherein alarm parameters are deduced from certain primary data received, so as to deliver a parameterized alarm to said management device,
wherein, when the alarm state of an item of an equipment in the network is unknown, there is extracted from said equipment chosen information able to allow determination of said alarm state, and then the sending of primary data representing said state information is simulated so as to generate an alarm intended to indicate to the management device the alarm state of said equipment, and
wherein each of the plurality of different primary event formats corresponds to a particular script.

14. The method as claimed in claim 13, wherein conversion step is carried out into a secondary configuration file format by means of an interpreted language.

15. The method as claimed in claim 14, wherein said secondary configuration file format is XML.

16. The method as claimed in claim 14, wherein said interpreted language is selected from a group consisting of JavaScript, VisualBasic, TCL, Perl and Python.

17. The method as claimed in claim 13, wherein, when there are primary data associated respectively with event identifiers, at least some of said conversion rules are associated with known event identifiers.

18. The method as claimed in claim 17, wherein at least one of said conversion rules defines a default script intended for primary data associated with an unknown event identifier.

19. The method as claimed in claim 13, in which alarms parameterized by hard coded values are delivered to said management device.

20. The method as claimed in claim 13, wherein alarms parameterized by values extracted from said primary data are delivered to said management device.

21. The method as claimed in claim 13, wherein there are delivered to said management device alarms parameterized by values extracted from the equipment from which it received primary data.

22. The method as claimed in claim 13, wherein said information or values are extracted from a management information base of the equipment concerned.

23. The method as claimed in claim 13, wherein said primary data are received in primary formats of the SNMP type.

24. A method of managing a communications network, the method comprising the steps of:
on reception of primary data transmitted by an item of equipment in the communications network and defining events in at least one primary format,
delivering to a management device of the communications network secondary data defining alarms representing said events, in a secondary format and a parameterized alarm deduced from certain primary data received from the item of equipment,
wherein said second format is generated by converting, by means of one a plurality conversion rules, arranged in the form of scripts associated with a plurality of primary event formats, primary data received in one of said primary formats into secondary data in said secondary format which can be interpreted by said management device,
wherein, when the alarm state of the item of equipment in the network is unknown, information is extracted from the item of equipment to allow determination of said alarm state, and sending of primary data representing said state information is simulated so as to generate an alarm intended to indicate to the management device the alarm of said item of equipment, and
wherein each of the plurality of different primary event formats corresponds to a particular script.

25. A method of managing a communications network according to claim 24, wherein the communications network is one of WDM network, a SONET network, an SDH network, an IP network, an ATM network, mobile and an NGN network.

26. The device as claimed in claim 1, wherein said information resides in a management information base of said equipment concerned.

27. The device claimed in claim 1, wherein the alarm state of said equipment is synchronized or resynchronized using said extracted chosen information.

28. The method as claimed in claim 13, wherein said information resides in a management information base of said equipment concerned.

29. The method claimed in claim 13, wherein the alarm state of said equipment is synchronized or resynchronized using said extracted chosen inform.

30. The method claimed in claim 13, wherein the alarm state of said equipment is synchronized or resynchronized in the event of a breakdown of the communications network or in the event of maintenance work.

* * * * *